Oct. 18, 1966

H. A. RAAB 3,279,356

BALING SYSTEM

Filed April 6, 1964

INVENTOR.
HILARY A. RAAB
BY Charles A. Penfold
ATTORNEY

Oct. 18, 1966    H. A. RAAB    3,279,356
BALING SYSTEM
Filed April 6, 1964    7 Sheets-Sheet 2

INVENTOR.
HILARY A. RAAB
BY Charles S. Penfold
ATTORNEY

H. A. RAAB 3,279,356

BALING SYSTEM

Filed April 6, 1964

INVENTOR.
HILARY A. RAAB
BY Charles A. Penfold
ATTORNEY

Oct. 18, 1966  H. A. RAAB  3,279,356
BALING SYSTEM
Filed April 6, 1964  7 Sheets-Sheet 5

INVENTOR.
HILARY A. RAAB
BY
Charles S. Penfold
ATTORNEY

3,279,356
BALING SYSTEM
Hilary A. Raab, Hammond, Ind., assignor to East Chicago Machine Tool Corporation, East Chicago, Ind., a corporation of Indiana
Filed Apr. 6, 1964, Ser. No. 357,411
29 Claims. (Cl. 100—45)

The subject invention relates generally to baling equipment and more particularly is directed to a machine or system whereby to automatically form bales or compacted material of uniform size and maximum density.

The equipment embodying the invention is preferably employed to bale material such as pulp and scrap paper, including, for example, box and corrugated board, newspapers, magazines, books, and the like, but may be utilized to bale any other suitable material or product.

A significant object of the invention is to provide a machine having top and bottom walls and relatively movable side wall structures defining an elongate chamber for receiving a material to be compacted by a ram to form a mass or bale, including means whereby said side wall structures may be adjusted to apply radial pressures to the mass in order to offer resistance to or retard forward travel of the mass while it is in the process of being formed. The arrangement is such that pressure is also applied to a mass or bale which has previously been formed so that the latter affords a resilient movable abutment for the mass or bale being formed.

An important object of the invention is to provide the machine with means for determining a condition of the mass or bale so that, for example, when it attains a predetermined size, such as length or compactness, means for controlling the operation or movement of the ram is arrested to locate the ram in a forward position to maintain the completed mass under compression so that if desired bale ties may be inserted into slots provided in the ram head. The slots also serve in channeling, laterally of the machine, any water or liquid which is squeezed out of the material during compression.

Another important object of the invention is to provide a machine or baler in which a power means thereof is preferably in the form of novel hydraulic structure for operating or actuating the ram, including means which offers a positive controlled resistance to the travel or motion of the material or mass being compacted in the chamber by the ram.

A particular object of the invention is to provide a machine or baler in which the means offering positive resistance to the travel of the mass, is preferably in the form of a movable platen which is operatively associated with a discharge area of the machine. The platen is operatively connected to fluid operable means which controls the resistance offered by the platen to the travel of the mass as above referred to. The fluid operable means is preferably in the form of a pair of hydraulically operated units extending longitudinally on opposite sides of the machine.

An important object of the invention is to provide a machine whereby the fluid operable means serves to control hydrostatic or adhesive resistance between the material being compacted and interior surfaces of the baling chamber, including adjustable means whereby the operation of the fluid operable means may be controlled to obtain any desired density, within practicable limits.

A particularly significant object of the invention is to provide a unique organization whereby material may be compacted into laminae or layers of predetermined thickness or size, and various means which may be selectively or jointly adjusted for obtaining the size desired.

An additional object is to provide a machine with means for determining a condition, size, or length of the compacted material or mass and operatively connect this means with the power means and the fluid operable means whereby the latter controls the power applied to the ram, including means for controlling the operation of the fluid operable means for effecting release of the platen from the mass when the latter has attained the desired condition.

Another object is to provide a platen embodying improved principles of design and construction, particularly as to its fabrication and the mode of mounting the same for movement.

A particular object is to provide a machine in which improved means, such as cables, are utilized to assist in controlling the operation of the fluid operable means in a manner whereby to stabilize the positioning of the platen.

Also, an important object is to provide unique hydraulic and electrical circuitry and mode of operatively connecting the same.

Another object is to provide a system which may include a conveyor operatively related with a discharge area of the baler for successively receiving completed bales.

A specific object of the invention is to provide a system which is automatically operable whereby to assist in separating and releasing a formed portion of the mass onto a platform or conveyor.

Other objects reside in providing a system, machine or apparatus which offers advantages with respect to manufacture and assembly, installation, efficiency, durability, safety and low cost of maintenance.

Many other objects and advantages of the invention will become apparent after the description hereinafter set forth is considered in conjunction with the drawings annexed hereto.

Figure 1:
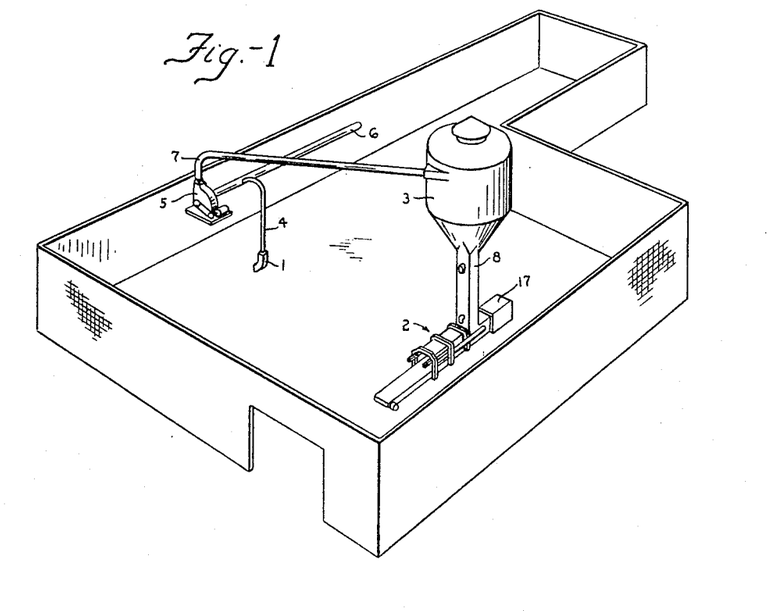
FIGURE 1 is a schematic or perspective view illustrating the general operative relationship of a system of baling.

The system embodying the invention may be designed and constructed in various ways, but as exemplified in FIGURE 1 of the drawings, it may include, among other things, a receiver 1 for initially receiving material to be compacted or baled, a machine or baler 2, a collector or cyclone separator 3, a conduit 4 communicatively connecting the receiver to an exhauster 5 by a duct 6, a conduit 7 connecting the exhauster and separator, and a discharge or feed chute 8 connecting the collector with the baler. The system may include additional material receivers corresponding to the receivers 1 which may be connected to the duct 6 to additional ducts.

The machine, among other things, comprises an elongate chamber, a movable platen disposed adjacent the chamber, a ram, power means for operating the ram to compact material received in the chamber against the platen, and fluid operable means operatively connected to the power means and the platen for the purpose of offering resistance to the travel of the platen with the material being compacted and for controlling the amount of power applied by the power means to the ram.

The machine may be utilized for compacting or baling the materials above referred to and particularly offers advantages with respect to compacting fluffy, fibrous material, such as pulp, which may be conveyed by a conventional means, such as air, through one or more conduits 4, duct 6 and conduit 7 to the collector 3, the latter of which receives the conveying air and the pulp conducted thereby. The machine constitutes a terminus for the conveyed material where it is compacted into a predetermined condition or bale of substantially uniform density. More particularly, the discharge or feed chute 8 directs the flow of material from the collector to a baling chamber of the machine and absorbs surges between the capacity of the machine and excess material delivery. The chute also serves to insure a static head of material in the chute over the baling chamber whereby to promote maximum capacity of the baler.

The machine or baler 2 may be designed and constructed in various ways but as exemplified in the drawings, it is constructed from relatively heavy stock to provide, among other things, a substantial frame having a base 9 for supporting the operating components. The base of the frame, as shown in FIGURES 2, 7, 10 and 11, includes a pair of longitudinal beams 10, ties 11 connecting the beams, a pair of longitudinally extending rails 12 supported on the ties, and a horizontal wall supported by the rails and/or beams and constituting a bottom wall 13 of an elongate chamber. The chamber is preferably designed and constructed to form what may be termed a first or receiving chamber generally designated 14, a second or forming chamber generally designated 15 constituting a continuation of the first chamber, and a discharge area generally designated 16 which may be considered as being a part or extension of the forming chamber. The structural characteristics of the chamber and discharge area will be described more in detail subsequently.

The machine or baler also comprises, among other things, controls within a cabinet 17 for the majority of the movable components of the machine, including a ram 18 having a piston rod 19. A box 20 adjacent the cabinet contains additional controls. The machine has a stationary top wall 21 disposed above and in parallel relation to the bottom wall 13, a pair of fixed vertically disposed parallel side walls 22, and a pair of movable side wall structures generally designated 23, constituting continuations of the fixed side walls.

Figure 7:
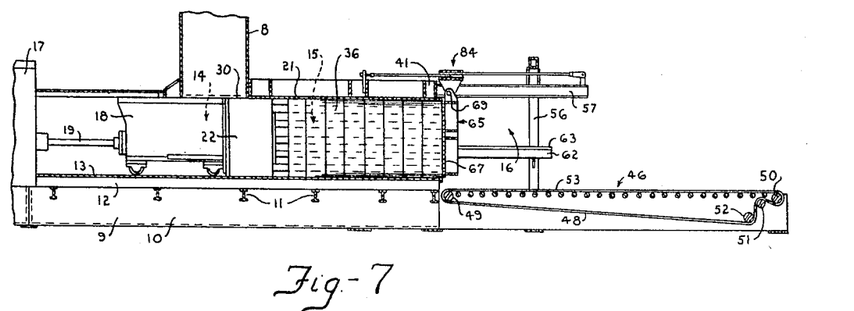
FIGURES 7, 8 and 9 are partial vertical sectional views showing the relative positions of various components of the machine and baling operations thereof.
Figure 8:
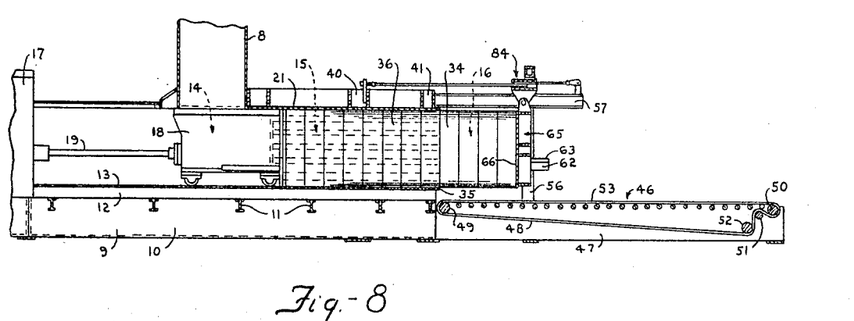
Figures 18, 21:
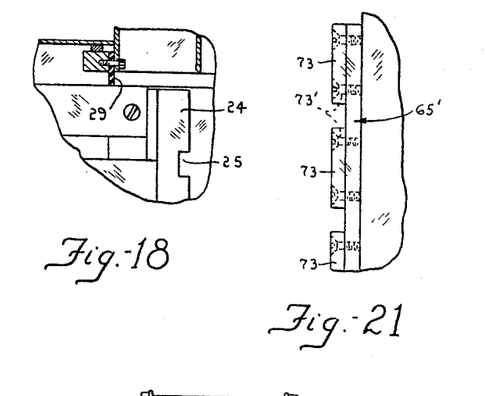
FIGURE 18 is a partial elevational view illustrating details with respect to the ram head and means for maintaining a surface thereof in a clean condition.
FIGURE 21 is a partial side elevational view showing a plurality of members detachably secured to the platen structure shown in FIGURE 18 whereby to provide horizontal slots for receiving baling wires and/or for the purpose of enabling water or other liquid squeezed out from the compacted material to run off laterally from the platen and machine.
Figure 19:
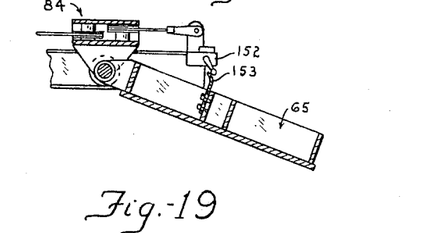
FIGURE 19 is a view showing more in detail the manner in which certain abutments or controls are adjustably respectively operatively associated with the platen and the frame.
Figure 23:
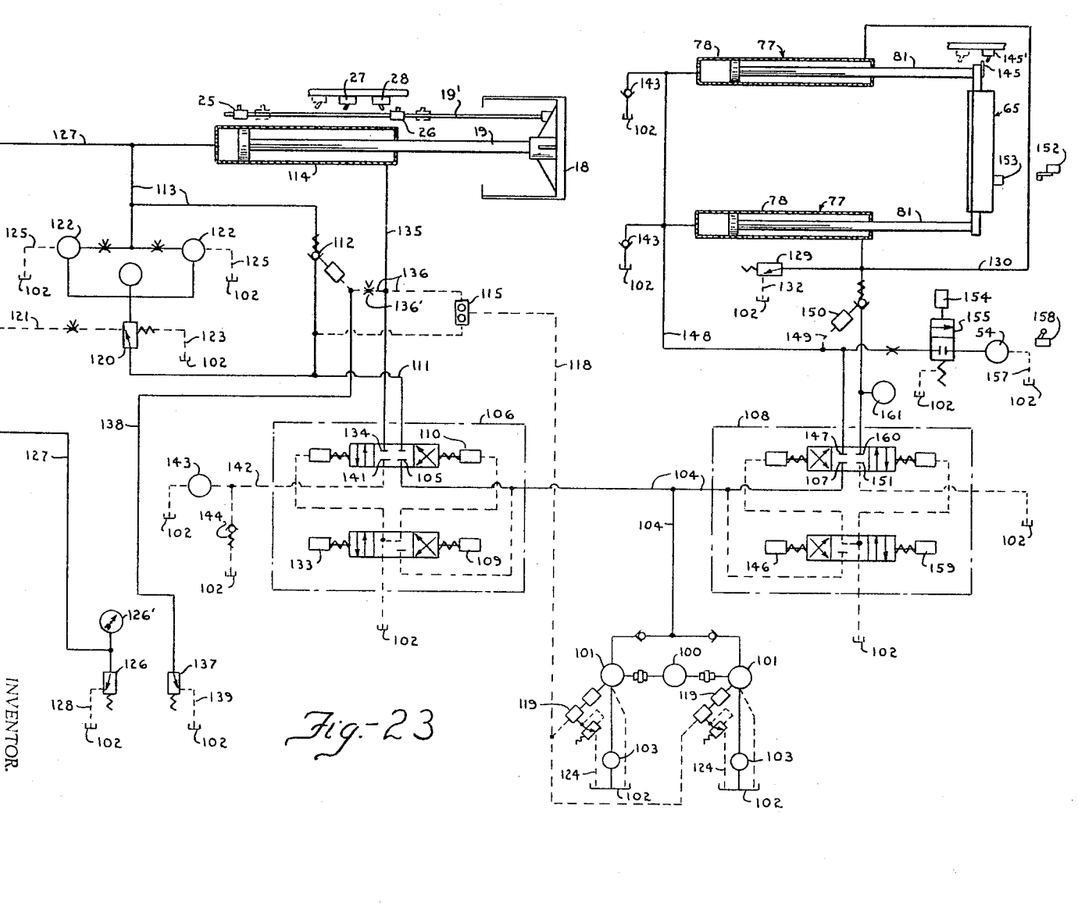
FIGURE 23 is a diagram of the hydraulic circuitry.

As evidenced in FIGURE 7 the ram is provided with pairs of wheels which ride on rails provided therefor. As shown in FIGURE 18, an impact surface 24 of the ram is provided with horizontal slots 25 in which wires may be received whereby to facilitate tying and/or packaging of compacted material into a bale or mass of predetermined size, or for the purpose of receiving water or other liquid for lateral discharge from the machine resulting, for example, from the compaction of a material such as wet pulp. As also shown in FIGURE 18 there is a resiliently flexible wiping element 29 for wiping an upper planar surface of the ram so as to confine in the first chamber the material initially received. In other words, the element serves to prevent material from working rearwardly of the ram into an enclosure located back of the first chamber. As shown in FIGURE 23 the ram 18 is provided with a rearward member 19′ which carries a pair of abutments or lugs 25 and 26 which are adjustable longitudinally with respect to one another on the rod for engagement with a pair of switches 27 and 28 which are adjustable longitudinally with respect to one another and the abutments whereby to control the travel of the ram, all of which will be described more in detail subsequently.

The top wall 21 of the machine is provided with an entrance 30, communicating with the chute 8, through which the material is initially received in the first chamber. At least a portion of this wall extends from the chute to free extremities of the side wall structures 23 and is reinforced by a plurality of longitudinal members anchoring a pair of upper longitudinal side members 31 and a plurality of longitudinally spaced transverse braces 32, the members and braces being welded to the top wall. The fore edge of the upper wall is preferably upturned as indicated at 33 in FIGURE 10 in order to facilitate release of a formed mass or bale from the second chamber such as the mass or bale 34; and the bottom wall is provided with a fore edge or terminus 35. The top, bottom, and side walls, in combination with the impact surface of the ram and a rear end of a mass 36 being formed may be considered to constitute the first chamber 14.

The movable side wall structures 23 may be designed and constructed in various ways. As exemplified in FIGURES 5 and 10 through 13, each wall structure is preferably comprised of a plurality of four vertically spaced horizontal resiliently flexible pressure members 37 having inner ends joined to a vertical plate 38, which in turn is anchored to one of a pair of vertical uprights 39. The pressure members of the respective side wall structures have forwardly extending free extremities which may bear against a pair of stanchions 40 and a pair of pillars 41 and terminate slightly beyond the latter. A vertical cleat 42 is preferably fixedly secured to intermediate portions of the pressure members of each side wall structure at appropriate locations whereby to assist in maintaining the pressure members in spaced relation. The top and bottom walls and side wall structures substantially define the second chamber 15 above referred to. The pairs of uprights, stanchions and pillars are each fabricated and spaced longitudinally apart, with the stanchions being located between the pillars and uprights and the uprights at the junction between the first and second chambers. The upper and lower ends of the uprights, stanchions and pillars are respectively anchored to the longitudinal side members 31 adjacent the top wall and to the beams 10, and the beams and/or lower ends of the uprights, stanchions and pillars are preferably reinforced by underlying plates or ties as shown in FIGURE 11, all whereby to provide a strong and durable composite structure.

A plurality of vertically spaced screws 43 are preferably carried by an inner wall 44 of each stanchion for selective manipulation against the cleats 42, so that, for example, these members and/or side wall structures may be adjusted to normally converge toward the longitudinal axis of the chamber, or otherwise adjusted whereby variable radial pressures may be applied to the material during compaction by the ram. In other words, provision is made whereby the side wall structures may be adjusted to apply radial pressures to any one of a plurality of different materials and/or combinations of these materials. If desired, the screws may be manipulated so that the side wall structure may converge upwardly as well as forwardly.

Figure 11:
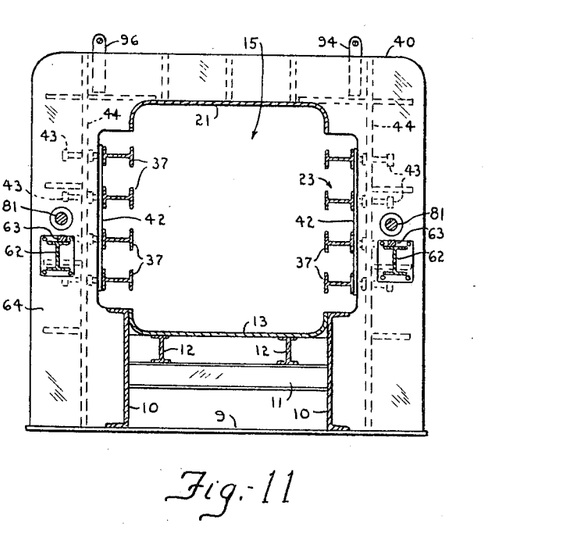
FIGURE 11 is an enlarged vertical section taken substantially on line 11—11 of FIGURE 4.
Figure 12:
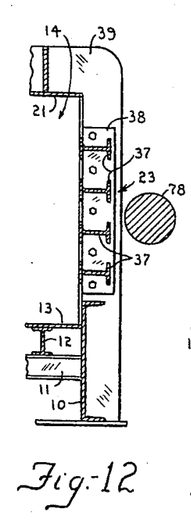
FIGURE 12 is an enlarged partial vertical section taken substantially on line 12—12 of FIGURE 4.
Figure 13:
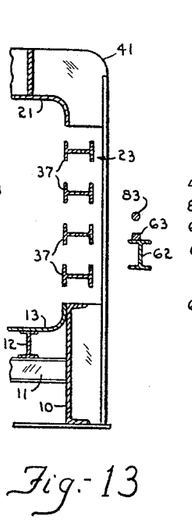
FIGURE 13 is an enlarged partial vertical sectional view taken substantially on line 13—13 of FIGURE 4 showing details of a pair of movable side wall structures defining portions of the baling chamber.
Figure 14:
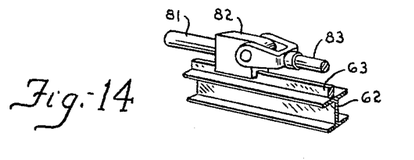
FIGURE 14 is a partial perspective view showing the mode of supporting ends of connecting rods constituting components of the fluid operable means.
Figure 15:
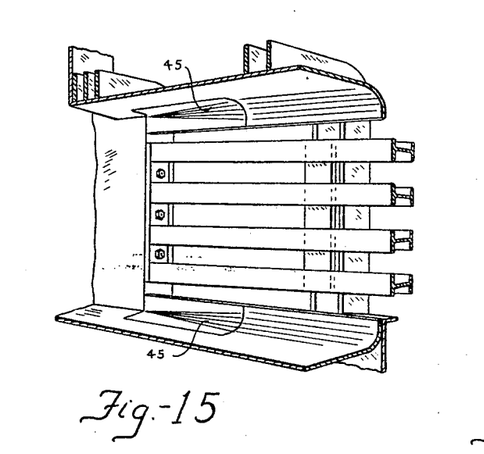
FIGURE 15 is a partial perspective view showing internal structure which assists in forming external surfaces of the material being compacted.
Figure 16:
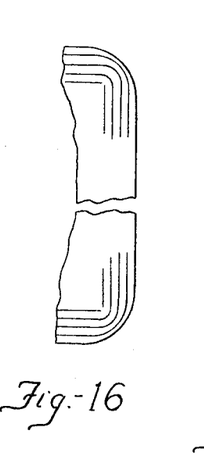
FIGURE 16 is an elevational view of a portion of a compacted mass which has been formed by utilizing the internal structure exemplified in FIGURE 15.
Figure 17:
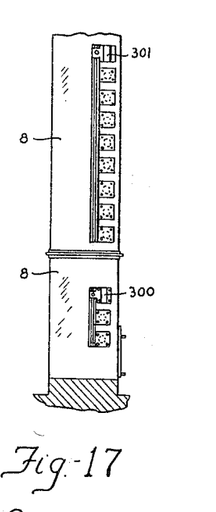
FIGURE 17 is a partial elevational view of the chute structure provided with control means which may be adjusted to control the size of the charges of material fed to the compacting chamber of the machine.

As illustrated in FIGURE 15, the upper and lower corners of the second chamber adjacent the first chamber are preferably provided with transition pieces 45 which gradually convert the square corners shown in FIGURE 12 into those which are concave as shown in FIGURE 11. In other words, the material when compacted in the first chamber has substantially square corners which are converted into corners having substantially convex configurations in the second chamber in order to promote the flow of the compacted material and obtain a greater state of compaction or density at its corners, as shown in FIGURE 16, and thereby reduce breaking of the resultant product to a minimum at the corners. The transition pieces are preferably welded in notched portions of the top and bottom walls and the welds are ground down and polished so as to obtain a smooth merging of the internal surfaces.

The machine, as depicted in FIGURES 4, 5, and 7 through 10, preferably includes an endless belt conveyor generally designated 46 which has a base comprised of a pair of heavy parallel longitudinal side channels 47 having inner ends whch are attached to the ends of the beams of the base 9 and/or to the pillars 41. The conveyor comprises an endless belt 48 which is supported at one end by a roller 49 and at its opposite end by three closely associated rollers 50, 51 and 52. The upper length 53 of the belt is preferably located in a horizontal plane slightly below that of the bottom wall 13 and generally constitutes a continuation thereof or a platform upon which a completed mass or bale of the material such as 34 is adapted to be deposited. A hydraulic motor 54 connected to the fluid system preferably drives the roller 50 and a tightening device 55 is associated with the roller 52 for varying the tautness of the belt. A pair of corner posts 56 are respectively secured to the side channels 47 of the conveyor frame in spaced relation to the pair of pillars 41. A pair of upper longitudinal parallel channel tracks 57 are partly carried by and generally constitute continuations of the side members 31 adjacent the top wall. These tracks extend between the pillars and posts and have extremities terminating forwardly predetermined distances beyond the posts. These extremities are secured together by a transverse end brace 58. The tracks 57 are also carried or supported to the posts 56 by brackets 59. The posts carry an arch structure having inclined ends joining the posts and a horizontal bar 60 disposed above the tracks.

The machine is also provided with a pair of I-beams 62 or equivalent means, carrying a pair of lower longitudinal tracks 63, having ends attached to forward members 64 of the stanchions 40, and extremities secured by brackets to inner sides of the posts 56 and extend forwardly predetermined distances therebeyond. The upper tracks 57 including the I-beams and/or lower pair of tracks, posts, a portion of the upper horizontal length of the belt conveyor and a movable platen generally designated 65 may constitute what may be termed the discharge area 16, above referred to, which is generally aligned with the first and second chambers.

Figure 2:
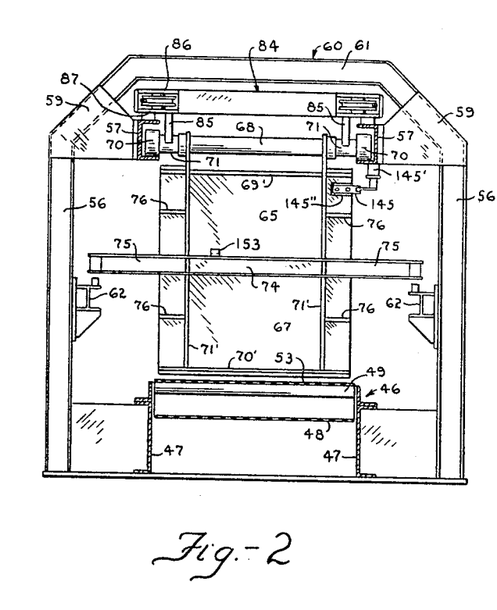
FIGURE 2 is a vertical sectional view taken through a discharge area of the baler showing internal structure of the baler.
Figure 3:
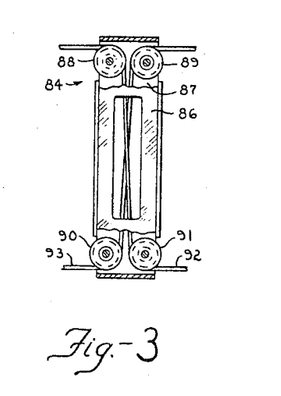
FIGURE 3 is a partial top view of a portion of a stabilizing mechanism operatively connected to a movable platen for positioning it in relation to the baling chamber.
Figures 4, 5, 6:
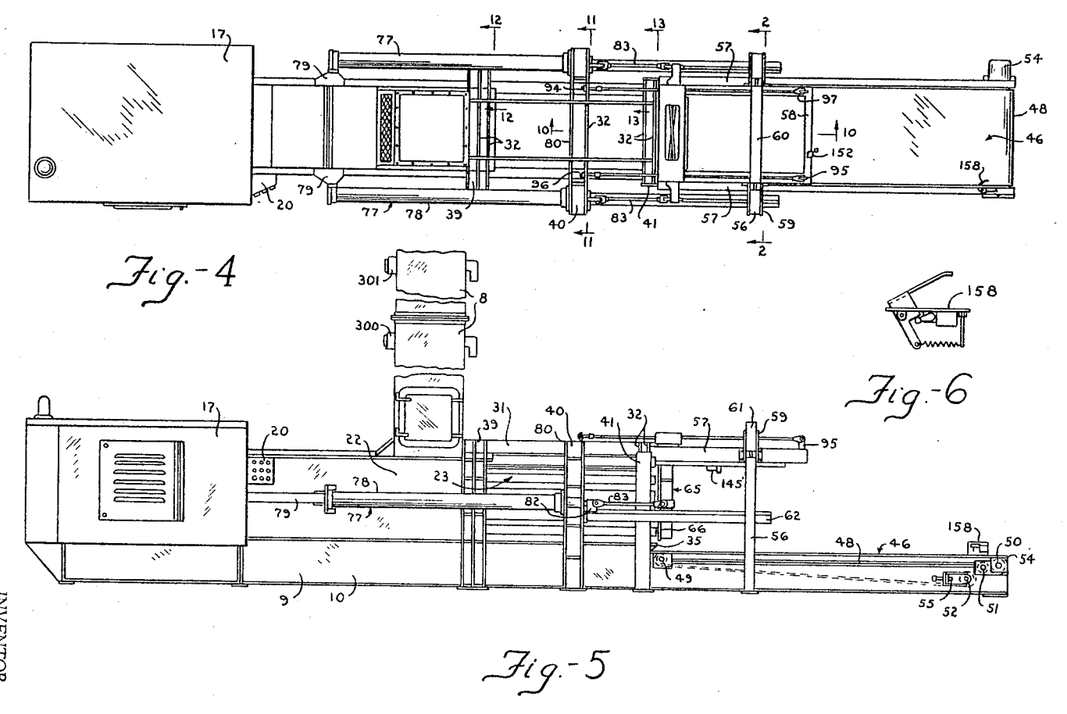
FIGURE 4 is a top view of the machine, with a part of a chute removed.
FIGURE 5 is a side elevational view of the machine.
FIGURE 6 is a side elevational view of a switch or control carried by a conveyor for engagement for a completed bale for controlling the operation of the conveyor and other components of the machine.
Figure 10:
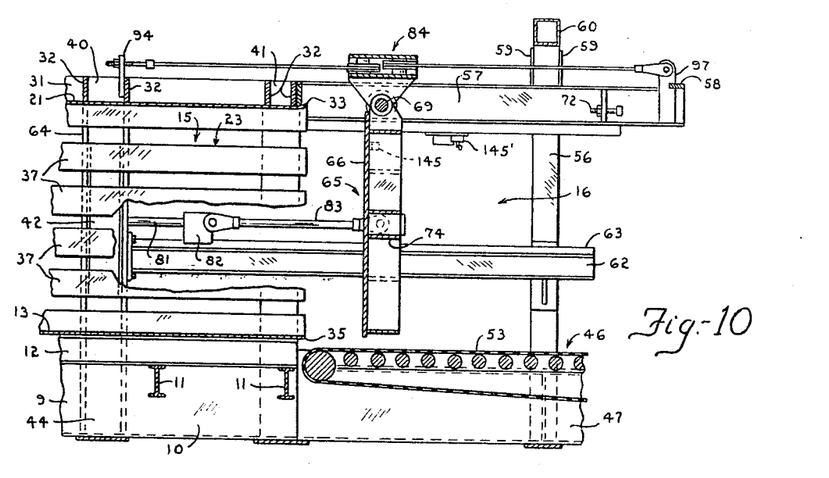
FIGURE 10 is an enlarged section, taken substantially on line 10—10 of FIGURE 4, of a portion of the machine.

The platen or abutment 65, as clearly shown in FIGURES 2 and 10, is preferably rectangular in shape and provided with a substantially planar rear surface 66 which receives the impact or pressure from the material being forced thereagainst through the chambers. This platen also has a substantially forward planar surface 67 provided with a reinforcing structure. The upper extremity of the platen is preferably provided with a cylindrical tubular formation 68 which carries a shaft 69 having ends projecting laterally from the sides of the platen and carrying rollers 70 which ride internally on the upper pair of channel tracks 57 for supporting the platen in a substantially depending position for movement lengthwise of the machine as well as for pivotation. It will be noted that the ends 71 of the tubular formation 68 terminate laterally of the sides of the platen and afford additional bearing support for the shaft. The platen is preferably limited in its forward movement by a pair of adjustable stops 72 carried by the tracks 57 for engagement by the rollers and limited in its rearward movement by engaging the fore ends of the side wall structures. The platen is also preferably provided with a rigid elongate channel cross bar 74 transversely welded to the forward surface 67 of the platen so that its free extremities 75 project laterally from the sides of the platen for connection with fluid operable means for a purpose to be later described. The reinforcing structure for the platen preferably includes top and bottom horizontal braces or walls 69' and 70' and a pair of parallel vertically disposed side braces or walls 71' all of which are welded in perpendicular positions to such surface. The top brace 69' is preferably inset with reference to the tubular formation 68 which carries the shaft 69 and the side braces 71' are preferably inset with respect to marginal side edges of the platen. The top and bottom braces or walls are preferably welded to the side walls, the side braces to the crossbar, and the side braces are further reinforced by members 76 which are welded thereto and to the platen.

Figure 20:
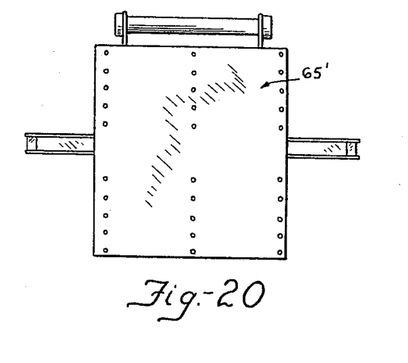
FIGURE 20 is a frontal elevational view of a modified form of a platen structure.

A modified form of a platen 65' is exemplified in FIGURES 20 and 21. This platen is provided with a plurality of horizontally and vertically spaced banks of round holes as clearly shown in FIGURE 20. A plurality of elongate members or strips 73 may be detachably secured to a frontal planar surface of the platen by screws 73' which extend through appropriate pairs of the holes for engaging threaded apertures in the platen for securing the strips in place to provide horizontal recesses or grooves between the strips so that when material, such as wet pulp, is compacted, any liquid squeezed therefrom may flow laterally through the recesses and free of the baling chamber. The recesses or slots defined by the members and the frontal surface of the platen also serve to receive baling ties in a manner similar to the slots 25 provided in the frontal surface of the ram 18. If the platen is used without the members 73 the banks of holes assist in allowing liquid to flow therethrough during compaction of the material whereby to release the liquid from such material.

Means are provided for controlling the operation of the platen above referred to. The means for this purpose is preferably comprised of a pair of fluid operable means in the form of hydraulically operated units generally designated 77 mounted on the sides of the machine. More particularly, each unit comprises an elongate cylinder 78 having a rear end anchored to a support 79 carried by a side wall 22 of the first chamber and a fore end anchored to a rear member 80 of a stanchion 40. An elongate piston rod 81 extends from the cylinder through the stanchion for disposition above one of the lower tracks 63. Shoes 82 are ridable on the lower tracks and are respectively adjustably connected to the fore ends of the rods and a pair of links 83 have opposite ends respectively pivotally and adjustably connected to the shoes and to the extremities 75 of the cross-bar 74 of the platen 65. The shoes, in addition to providing a connection between the rods and links also serve to support the fore ends of the rods to prevent bending or distortion thereof.

The machine may be provided with means, generally designated 84, preferably in the form of a pantograph assembly, whereby to assist in stabilizing the position of the platen 65. More particularly and as illustrated in FIGURES 2, 3, 4 and 10, a generally rectangular box or carriage-like structure is supported on the upper extremity of the platen in a substantially horizontal position by a pair of brackets 85 secured to the ends 71 of the tubular formation 68. The carriage includes top and bottom walls 86 and 87. A pair of sheaves 88 and 89 is pivotally journaled on the upper and lower walls at one extremity of the carriage and a corresponding pair 90 and 91 at its opposite extremity.

A pair of cables 92 and 93 are operatively associated with the sheaves and the frame. More specifically, the cable 92 has an intermediate portion engaging sheaves 88 and 91, an end connected to a lug 94 carried by one of the braces 32 of the reinforcing structure of the top wall 21 and an opposite end connected to a lug 95 carried by the fore end of one of the upper tracks 57. The other cable 93 similarly has an intermediate portion engaging the sheaves 89 and 90, an end connected to a lug 96 carried by the brace 32 carrying the lug 94, and its opposite end to a lug 97 carried by the fore end of the other of the pair of tracks 57. Thus, the cables are arranged in a generally crossed engaging relationship with the sheaves with their ends connected to the machine at longitudinally spaced locations. With this unique organization the cables assist in controlling the operation of the fluid operable means 77 at the sides of the machine and as a consequence thereof serve to stabilize or normalize the position of the platen, particularly with respect to its return movement against the mass remaining in the chamber after a portion of the mass has been discharged therefrom.

The hydraulic system or circuitry exemplified in FIGURE 23 of the drawing will now be described. The purpose of this system is to provide fluid power for the ram with sufficient thrust and at such rates of speed as to develop the results desired for efficient compacting or baling operations. A motor 100 may drive one or a pair of pumps 101 for drawing fluid from a storage tank or reservoir 102 and through one or a pair of filters 103. The fluid circulates through the pumps and is delivered to a pipe or line 104 connected to a port 105 of a four-way valve 106, as well as to a port 107 of a four-way valve 108.

When a beam of a vertically adjustable electric device or eye 300 is interrupted, a conductor carries a signal to a series of relays in the cabinet 17 and actuates a solenoid 109 of the valve 106 whereby fluid will be forced by the pumps through the port 110 of the valve in a line 111. Fluid flows from the line 111 through a check valve 112 and through a line 113 to a cap end of a master cylinder 114, whereby to effect forward movement of the ram 18. When fluid pressure builds up in the line 111, a ball in a shuttle valve 115 is forced against a seat preventing flow of the fluid through a pilot line 136 connected to the check valve 112 while allowing the fluid to flow through a line 118 to two pressure governors 119 of the pumps 101 so the pumps will deliver increased or high pressures. Also, when pressure builds up in the line 111 against a valve 120 and in the master cylinder 114, fluid will flow through a pilot line 121 to open this valve. Fluid also flows through the valve 120 and through a pair of pulsating boosters 122 and the line 113. The boosters develop high impact pressures creating rapid interrupted strokes to the ram. The power means for transmitting power to the ram may be means other than that shown provided that it is suitable for the purpose. A drain line 123 returns pilot line fluid from the valve 120 to the storage tank 102. Drain lines 124 from the pressure governors 119 of the pumps allow pilot line oil or fluid to drain into the tank 102 and drain lines 125 connect the boosters 122 to the storage tank. A relief valve 126 is connected by a line 127 to the cylinder 114 as a safety factor to maintain a predetermined maximum pressure in the cylinder, which may be indicated on a gauge 126'. A drain line 128 connects the valve 126 with the storage tank.

The arrangement is preferably such that if the total resistance offered by the side wall structures 23 and the platen 65 on the bale 34 and the mass 36, as developed for these components exceeds the desired baling pressure as preset by a valve 129, such pressure will be relieved by fluid flowing through a line 130, a valve 129, and back to the storage tank through a line 132. When the ram head reaches a normal forward operating position as indicated by its position in FIGURE 8, the abutment 26 on the member 19' of the ram will actuate the switch 28 to energize through a connductor a series of relays in cabinet 17, which in turn actuate a solenoid 133 of the valve 106 so the latter will allow fluid to be forced by the pumps through a port 134 of this valve and through a line 135 to the rod end of the cylinder 114 whereby to retract the ram. A line 136 connects the line 135 with an orifice valve 136' and this valve is connected to a preset relief valve 137 which governs pilot line pressure available to the check valve 112 through a line 138 so that the valve 112 will open and thereby relieve the pressure at the cap end of the cylinder 114. A drain line 139 connects the relief valve 137 with the tank 102. The line 138 is connected to a port 134 of the valve 106 to allow fluid to flow through port 141 of the valve into a line 142 and then through to a cooler 143 and back to the tank 102. A relief valve 144 prevents excessive pressure in the line 142 and drains out through the same to the tank. The pilot line 136 is also connected with the shuttle valve 115 so that fluid flowing in the line 135 will force the ball of this valve against a seat to block the flow of oil or fluid from the cap end of the cylinder 114, and at the same time provide pilot line fluid for the operation of the two pressure governors 119 of the pumps 101.

When the platen 65 is advanced by the forward travel of the ram against the mass 36 and the bale 34, a pair of check valves 143 act as prefill valves to allow the fluid to be drawn from the tank into cap ends of the cylinders 78 of the fluids operable means 77, while preventing fluid from returning back to the tank while the ram is at rest.

When a bale 34 has been formed to a predetermined size, length, condition or density by repeated strokes of the ram, a dog 145 on the platen actuates a switch 145' to energize through a conductor a series of relays in the cabinet 17 to actuate a solenoid 146 of the valve 108 causing this valve to shift so that the fluid will be forced from the pumps through the port 107 out a port 147 and through a line 148 to the cap ends of cylinders 78, which advances the platen 65 forwardly. The dog 145 is adjustable on a fitting 145'', shown in FIGURE 2, carried by the platen and the switch 145' is adjustably mounted on the frame. A line 149 provided with a check valve 150 connects with the line 148 and conducts fluid to actuate this valve so that fluid may drain from the cylinders 78 through port 151 of the valve 108 back to the tank 102. When the platen 65 reaches a predetermined position, a switch 152 is actuated by a dog 153 carried by the platen to energize through a conductor a series of relays in the cabinet to operate a solenoid 154 of a valve 155 so that the latter will allow fluid to be forced by the pumps through a hydraulic motor 54, through a drain line 157 and back to the tank 102. When the motor 54 is operating, the bale or mass is advanced onto the belt conveyor 46 and as the bale advances it actuates a switch 158 which de-energizes the solenoid 154 of the valve 155, thereby stopping the motor 54, a solenoid 159 of the valve 108 is energized to operate this valve so that the fluid will be forced by the pumps through a port 160 of this valve to the rod ends of the cylinders 78 whereby to effect retraction of the platen 65 until it is forced against the mass as exemplified in FIGURE 7, with a force as preset by a valve 161 which force is less than the relief pressure setting of the valve 129. Fluid from the cap ends of the aforesaid cylinders flows through the valve 108 directly to the tank 102 through a port 151. Hydraulic fluid pressures developed at the rod ends of the cylinders 78 actuate a switch of the valve 161 to energize a circuit to operate the solenoid 109 of the four-way valve 106 causing this valve to shift so that the fluid will flow to the rod end of the cylinder 114 in a manner whereby to effect a retraction of the ram back to a position where the dog 25 on the member 19′ trips the switch 27 to de-energize the solenoid of the valve 106 to thereby complete a baling cycle.

Figure 24:
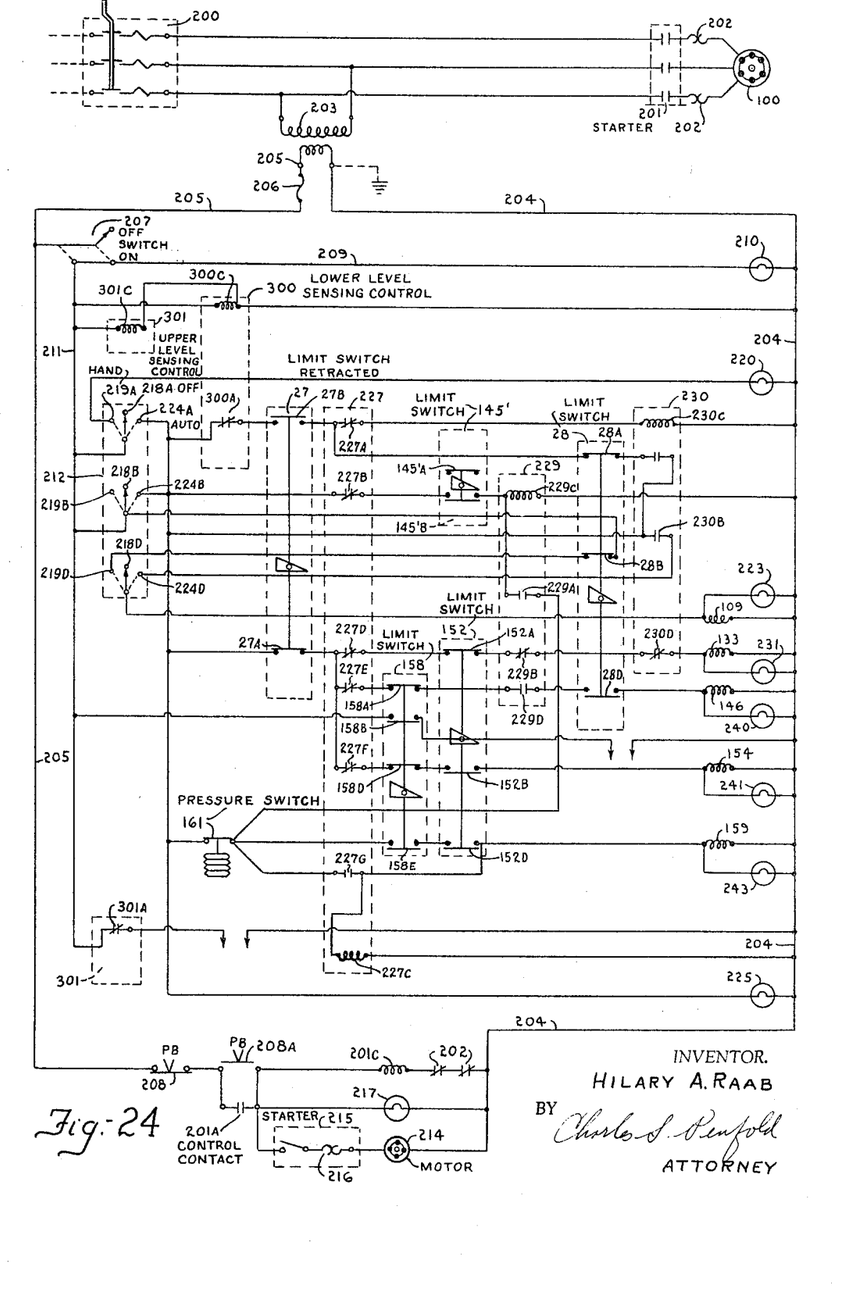
FIGURE 24 is a diagram of the electrical circuitry.

The electrical system or circuits, as exemplified in FIGURE 24 will now be described. The purpose of this circuit is to provide primary electrical power to all motors herein connected and reduced voltage power for the control circuit. The control circuit is so interconnected as to provide the sequence of operations necessary for the equipment to function as one integrated unit.

Primary power, supplied by the purchaser, is connected to a switch 200 and to a motor starter 201. Two of three conductors for the motor connect to overloads correspondingly designated 202 and the third conductor directly connects the motor starter with the baler motor 100. A two-conductor connection is made on the downstream side of switch 200 to a reducing voltage transformer 203 which provides reduced-voltage power for all controls thereinafter set forth. A conductor 204 from the low voltage side of the transformer may be considered as a common conductor. Another conductor 205 passes through a fuse 206 and connects to the upstream side of all controls while conductors downstream from the controls generally connect with the common conductor 204.

The conductor 205 from the fuse 206 is connected to switches 207 and 208. When the switch 207 is closed, current is conducted to the entire control circuit. All relays are shown in their normal condition prior to energization. The limit switches are shown with all rams in normal stored positions at beginning of a baling cycle. The symbols PB appearing in FIGURE 24 designate push button switches. Specifically, current is conducted through a conductor 209 to an indicating light 210 and then to the conductor 204. Current also flows through a conductor 211, through the lower sensing electric control coil 300C of relay 300 to the conductor 204, an upper electric sensing control coil 301C of a relay 301, to a three pole switch 212 and a contact 301A of a relay 301.

When the magnetic motor starter 201 is energized, by closing a push button PB208A, a coil 201C of starter 201 is energized closing an auxiliary control contact 201A whereby to seal the circuit when PB208A is released and current will flow to an oil cooler motor 214, through its starter 215, an overload 216, thence to 204, and to light 217 and back to 204.

When a vertically adjustable electric upper level sensing device or eye control relay 301 is operated by interrupting the sensing beam, the coil 301C of relay 301 will close relay contact 301A to perform functions such as operate switches, bypasses, etc.

When the three pole switch 212 is manually moved from an "OFF" position 218 to "HAND" position 219A, current will flow through an indicator light 220, to conductor 204 and from a switch 219D to the downstream side of a switch 28, and then back to the switch 212, through a solenoid 109 to conductor 204, light 223 and conductor 204. This causes the valve 106 to shift and allow hydraulic fluid to flow to the cap end of the cylinder 114 to cause the ram to advance as desired when one or more hydraulic pumps 101 are operating.

When switch 212 is turned from the "OFF" position 218 to an "AUTOMATIC" position 224A, current will flow through indicating light 225, to conductor 204, and also through a contact 27A of switch 27, a contact 227D of relay 227, a contact 152A of switch 152, contact 229B of relay 229 and a contact 230D of relay 230, a light 231, conductor 204, and solenoid 133 of the valve 106 so that hydraulic fluid will flow to the rod end of cylinder 114 to forcibly return the ram, providing the pumps 101 are operating. Therefore, whenever switch 212 is in any position but the "AUTOMATIC" position 224 and said switch is turned to this position the ram of the hydraulic cylinder 114 will always retract.

In view of the foregoing, and assuming that the hydraulic pump or pumps are in operation and the switch 212 is in the "AUTOMATIC" position 224, the ram will continue to retract and as it comes to a stop the switch 27 will be actuated to interrupt the flow of current to the solenoid 133 of the valve 106, thereby preventing further fluid flow to the master cylinder 114.

When the lower level sensing control relay 300 is operated by deenergizing coil 300C through interrupting the light beam, current flows from contact 224A of the switch 212 through a contact 300A of relay 300, a contact 27B of switch 27, a contact 227A of relay 227, to a coil 230C of the relay 230 and to conductor 204. A sealing circuit, created when the coil 230C of relay 230 is actuated, allows current to flow from contact 224A of switch 212 through a contact 230A of this relay, a contact 28A of the switch 28, to the upstream side of the contact 227A of relay 227, through contact 227A of relay 227, coil 230C of relay 230, and conductor 204. This sealing circuit assures continuance of the ram stroke to its entirety even if the control 300 becomes de-energized during the forward stroke of the ram. When the ram 18 advances to a predetermined distance in the baling chamber completing its forward stroke, the switch 28 adjacent the piston rod of the ram is actuated, breaking a contact therein and opening the sealing circuit described above. The coil 230C of relay 230 is de-energized, thus opening the circuit between switch 212 and the solenoid 109 to actuate the valve 106 and momentarily stop the flow of fluid to the cylinder 114. At the same time that the solenoid 133 of the valve 106 is energized by current flowing from the switch 212 through contact 27A of switch 27, contact 227D of relay 227, a contact 152A of a switch 152, a contact 229B of relay 229, contact 230D of relay 230 to light 231 and solenoid 133 to conductor 204. When the solenoid 133 is energized on the valve 106, this valve shifts to allow fluid to flow to the rod end of cylinder 114, thereby retracting the ram.

Figure 9:
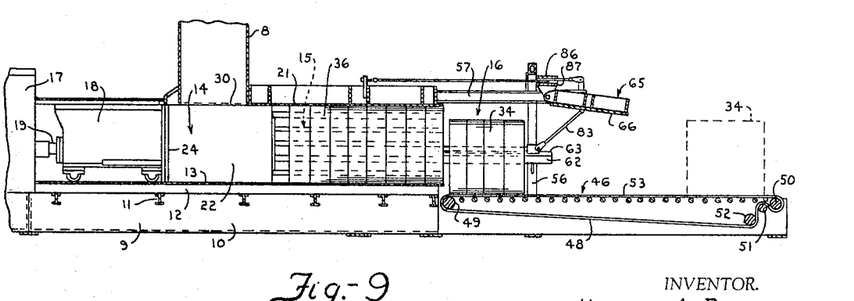

After repeated strokes of the ram 18 in the baling chamber the mass 36 is advanced, to form the bale 34 to a predetermined size or condition, causing the resistance platen 65 to move forwardly until the switch 145′ is actuated, making a contact so current will flow from contact 224B of switch 212 through contact 22B of relay 227, the contact 145′B of switch 145′, coil 229C of relay 229 to the conductor 204. A sealing circuit for the relay 229 is established from contact 224A of switch 212 through a pressure switch 161, contact 229A of a relay 229 to conductor 204. The baling ram 18 continues its forward motion until the switch 28 is actuated de-energizing coil 230C of relay 230 and the solenoid 109 of the valve 106 for shifting this valve to stop the ram in its forward position. Also, actuation of the switch 28 energizes the solenoid 146 through a circuit from contact 224A of switch 212 through contact 27A of switch 27, a contact 227E of relay 227, a contact 158A of switch 158, a contact 229D of relay 229, a contact 28D of switch 28, the solenoid 146 of valve 108 to conductor 204, and a light 240 to conductor 204. When the solenoid 146 of the valve 108 is energized the valve will shift to allow fluid to flow to the cap ends of the cylinders 78. When the resistance platen moves forwardly the bale shears at the terminus or edge 35 of the bottom wall 13 of the baling chamber and drops onto the conveyor 46. Further forward motion of the resistance platen carriage forces it against the stops 72 causing the platen 65 to pivot until it clears the vertical height of the bale 34. At the top of its raised position switch 152 is actuated, energizing the solenoid 154 of the valve 155 causing this valve to open and allow fluid to flow to the motor 54. The solenoid 154 is energized by a circuit from contact 224A of the switch 212 through contact 27A of the switch 27, a contact 227F of relay 227, a contact 158D of switch 158, a contact 152B of switch 152, solenoid 154 to the conductor 204 and a light 241 to conductor 204. The solenoid 146 remains energized providing hydraulic pressures on the cylinders 78 to keep the resistance platen 65 in a raised position as shown in FIGURE 9. The bale 34 on the belt conveyor 46 advances to a position which is sufficiently in advance of the pivotal arc of the platen to allow the platen to later return to a vertical depending position. The above forward travel of the bale 34 actuates the switch 158. A set for contacts 158B of this switch may be utilized to feed current to controls for bale transfer, an automatic tying device or other function. The set of contacts 158D on the switch is opened to de-energize the solenoid 154 of the valve 155 causing this valve to close whereby to stop the motor 54. Another set of contacts 158E of the switch 158 is closed, to energize the solenoil 159 of the valve 108 through a control circuit from switch 212 through the pressure switch 161, contacts 158E of switch 158, a contact 152D of switch 152, solenoid 159 to the conductor 204 and a light 243 to conductor 204. As the solenoid 159 is energized, a spool of the valve 108 shifts so that fluid will be forced to the rod ends of the cylinders 78. As the cylinder rods retract, the platen 65 pivots to a substantially vertical depending position and then is drawn rearwardly toward the mass 36.

Simultaneously with the energization of solenoid 159 the coil 227C of the relay 227 is energized by a circuit from the switch 212 through the pressure switch 161, a contact 227G of relay 227A, coil 227C of the relay 227 to conductor 204. The coil 227C of relay 227 is sealed in by one of its own contacts 227G and constitutes a blocking relay to prevent all other operations of the baling cycle to operate until the platen has traveled in reverse into intimate contact with the mass 36 at the discharge area 16, and develops resistance pressure in the cylinders 78 to actuate the switch 161 to simultaneously de-energize the solenoid 159, coil 227C of relay 227 and coil 229C of relay 229 causing current to flow from switch 212 through contact 27A of switch 27, contact 227D of relay 227, contact 152A of switch 152, contact 229B of relay 229, contact 230D of relay 230, solenoid 133 to conductor 204, and light 231 to the conductor 204. When the solenoid 133 of the valve 106 is energized, the valve shifts to allow fluid to flow to the rod end of the cylinder 114, thereby returning the ram and completing a baling cycle.

In view of the foregoing, it will be manifest that improved means have been provided for compacting material, preferably of a fibrous character, into a compact mass of substantially uniform density and that corner portions of the mass are compacted to a higher or a greater degree of density than the remainder of the mass in order to assist in preventing breakage of the mass at the corner positions.

It will also be apparent that the ram and platen constitute relatively movable members or elements for compacting material therebetween and that the platen element offers a controlled amount of resistance to the forward motion or travel of the mass of material and is movable in a direction to release a portion of the mass onto a platform and in an opposite direction to a predetermined position for engagement with the remainder of the mass.

Figure 22:
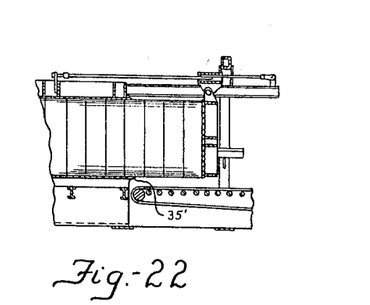
FIGURE 22 is a partial side elevational view depicting layers or laminae of compacted material, which view is presented for the purpose of showing a condition which is avoided by utilizing one or more unique controls embodied in the system or machine.

Furthermore, it will be evident that the machine is provided with a plurality of means which may be adjusted with respect to one another and/or jointly in such a manner that the size of the portion of the mass that is to be released may be readily controlled. More particularly in this regard attention is directed to the fact that the electrical level sensing devices, eyes or control means 300 and 301 carried by the chute 8 may be adjusted with respect to one another for measuring the charges of material into the chamber 14 of the machine. The size or character of the portion of the mass to be released may also be obtained by adjusting the switches 27 and 28 and/or the abutments 25 and 26 whereby the length of the stroke of the ram may be varied. Also, the size of the portion of the mass to be released may also be obtained by adjusting the switch 145' and/or the abutment 145. Moreover, the valve 129 may be adjusted to regulate the operation of the fluid operable means 77 whereby to control the position of the platen in order to assist in releasing a predetermined size of material from the mass. These factors are very important and have been incorporated in the machine for the purpose of avoiding the condition illustrated in FIGURE 22 of the drawing wherein a parting line between adjacent layers or portions of the mass fails to coincide with a terminus or edge 35' of the machine and at the same time promote efficiency in the overall operation of the machine.

Having thus described my invention, it is obvious that various modifications may be made in the same without departing from the spirit of the invention, and therefore, I do not wish to be understood as limiting myself to the exact forms, constructions, arrangements, and combinations of parts herein shown and described.

I claim:

1. A machine for the purpose described comprising a frame having walls defining an elongate chamber for receiving material to be compacted, said chamber having an entrance at one end through which the material is freely introduced to the chamber and an outlet at its opposite end, said frame having sides provided with elongate guide means, a platen pivotally and slidably connected to said guide means disposed adjacent said outlet for movement in general alignment with said chamber, a ram, fluid power means for operating said ram for compacting material against said platen as it is received in said chamber through said entrance, means offering resistance to the forward movement of said platen, means operatively connecting said power means and said resistance means whereby the latter controls the power applied to said ram, means for determining a compacted condition of the material, and conduit means operatively connecting said resistance means, said determining means and said power means whereby when the material attains said condition said platen is pivoted therefrom.

2. A machine for compacting material into layers comprising a frame, top, bottom and side walls defining an elongate chamber provided with an entrance at one end for freely receiving the material to be compacted and an outlet at its opposite end, elongate guide means provided on said frame adjacent said side walls, a platen pivotally and slidably mounted on said guide means adjacent said outlet for movement lengthwise of said chamber at least a distance equal to the thickness of one or more layers, a ram, power means for reciprocating said ram and platen for compacting into a layered mass material received in said chamber against said platen and for effecting movement of said mass and platen forwardly beyond said chamber with the mass clamped between said ram and platen, and means for effecting a release of one or more layers of the mass when the platen reaches a predetermined position longitudinally beyond said chamber.

3. In combination: a frame provided with an elongate chamber having a terminal transverse edge, said chamber being provided with an outlet and also with an entrance through which charges of material may be introduced into the chamber for compaction into layers and discharged from said outlet, elongate guides provided at the sides of said frame, a platen pivotally and slidably mounted on said guides in a depending position for movement longitudinally of said chamber at least a distance equal to one or more layers, a ram, power means for reciprocating said ram, and said platen to compact the material therebetween to form a mass of layers, said platen being movable forwardly to a predetermined position beyond said transverse edge while the mass is between said ram and platen whereby to locate the mass so that one or more layers thereof extending beyond said edge will be assisted by said edge in severing said portion from the remainder of the mass when said platen is released therefrom.

4. A machine of the character described comprising a frame having walls including a bottom wall defining an elongate chamber for receiving material for compaction, a movable platform disposed adjacent said chamber and generally constituting a continuation of said bottom wall, a platen pivotally carried by a said frame and movable lengthwise of said chamber, a ram, fluid power means for driving said ram to compact material received in said chamber against said platen into a compact mass and moving at least a portion of the latter including said platen to a predetermined position over said platform, fluid operable means connected to said fluid power means for effecting pivotal movement of said platen away from said ram for releasing said portion onto said platform, a control actuable by a condition of the mass for controlling the operation of said movement effecting means, and a control operable by said platen for controlling movement of said platform in one direction.

5. In combination: structure providing an elongate chamber having an inlet for receiving material to be compacted and an outlet, a ram for compacting into a mass the material received in said chamber, chute means communicating with said inlet, a plurality of longitudinally spaced conrol means associated with said chute means for controlling the amount of material fed to said chamber and carying the size of the mass discharged through said outlet, at least one of said control means being longitudinally adjustable with respect to the other control means.

6. A machine for compacting material comprising a frame provided with top, bottom, and side walls defining an elongate chamber having an entrance at one end for receiving the material to be compacted and an outlet at its opposite end, a movable platform generally constituting an extension of said bottom wall, guides carried by said frame, a platen mounted on said guides for movement lengthwise of said chamber at a location adjacent said outlet, a ram, power means for operating said ram for compacting into a mass material received in said chamber against said platen for effecting movement of said mass and platen, elongate fluid operable extensible means connected adjacent to sides of said frame and said platen offering resistance to lengthwise movement of said mass and platen, means for determining a condition of the mass, and means operatively connecting said determining means, said power means, and said resistance means for reducing the resistance whereby to effect movement of said platen to release at least a portion of the mass onto said platform.

7. In combination: a frame having walls defining an elongate chamber for receiving material to be compacted, an upper pair of longitudinal tracks carried by said frame, a platen provided with means engaging said tracks for movement thereon, a support mounted on said platen, sheaves carried by said support, and crossed cable means having intermediate portions operatively engaging said sheaves and having ends connected to said frame at longitudinally spaced locations assisting to stabilize the position of said platen when the latter is moved on said tracks.

8. In combination: a frame having walls defining an elongate chamber for receiving material to be compacted, a pair of longitudinal tracks carried by said frame, a platen provided with upper offsets engaging said tracks and supporting said platen in a depending position for movement lengthwise of said chamber, and means below said offsets projecting laterally from said platen and having extremities terminating at locations externally of sides of said chamber for attachment with means assisting to control the position of said platen.

9. In combination: a frame having walls defining a chamber for receiving material to be compacted, a pair of upper longitudinal tracks and a pair of lower longitudinal tracks, a platen provided with offsets engaging said upper tracks for movement thereon, means carried by said platen and having lateral extended extremities, movable means engaging said lower tracks, and means operatively connecting said movable means and said extremities, actuating means, and means operatively connecting said movable means and said actuating means for effecting movement of said movable means whereby to assist in controlling the position of said platen.

10. The combintaion defined in claim 9, including means operatively connecting said platen and said frame assisting to stabilize the position of said platen.

11. In combination: a frame having walls defining an elongate chamber for receiving material to be compacted, a pair of upper longitudinal tracks carried by said frame, a platen provided with offsets engaging said tracks and supporting said platen in a depending position for pivotal and lengthwise movement relative to said chamber, means projecting laterally from said platen and having extremities, fluid operable means, and means operatively connecting said extremities and said fluid operable means whereby the latter assists in controlling the operation of said platen.

12. The combination defined in claim 11, including means operatively connecting said platen and said frame serving to influence the operation of said fluid operable means.

13. In combination: a frame having walls defining a chamber for receiving material to be compacted, a pair of upper longitudinal tracks and a pair of lower longitudinal tracks, a platen provided with offsets engaging said upper tracks for movement thereon, means carried by said platen and having lateral extended extremities, movable means engaging said lower tracks, and means operatively connecting said movable means and said extremities, and said movable means being provided with means facilitating connection with actuating means adapted to assist in positioning said platen.

14. In combination: an elongate frame, top and bottom walls and side structures attached to said frame and forming an elongate chamber provided with an entrance for material adapted for reception in said chamber and also an outlet, said bottom wall having a terminus at said outlet, a platform disposed below said bottom wall, a pair of upper tracks and a pair of lower tracks carried by said frame and extending forwardly beyond said chamber, a platen having means engaging said upper tracks whereby said platen may travel and/or pivot on said tracks, a pair of resistance means respectively disposed at the sides of said frame, a pair of shoes respectively engaging said lower tracks, means connecting said resistance means and said shoes, a pair of links having ends respectively pivotally connected to said shoes and to said platen, a ram for compacting into a mass against said platen material received in said chamber through said entrance, said platen through said resistance means offering resistance to compaction and forward travel of the mass in said chamber during movement of said platen on said upper tracks and movement of said shoes on said lower tracks, said ram and platen cooperating to clamp the mass therebetween and carry a portion thereof beyond said chamber, and means for releasing said platen from said portion whereby said terminus assists in separating the same from said mass onto said platform.

15. In combination: an elongate frame provided with longitudinally extending guideways, top and bottom walls and side structures connected to said frame and forming an elongate chamber having an outlet and also an entrance whereby material may be received in said chamber for compaction and discharge from said outlet, said bottom wall having a terminus at said outlet, a platen supported for pivotal and longitudinal movement in said guideways, resistance means connected to said frame and to said platen, a ram, power means for operating said ram forwardly to compact into a mass against said platen material received in said chamber, said platen and said mass being movable forwardly by said ram against the resistance offered by said resistance means whereby a portion of the mass is caused to extend beyond said chamber, and means for moving said platen away from said mass whereby said terminus assists in separating said portion from the remainder of said mass.

16. In combination: a frame and opposed walls carried by said frame defining an elongate chamber for receiving material to be compacted, one of said walls extending throughout the length of said chamber and having an edge disposed transverse to the longitudinal axis of said chamber, guides carried by said frame, a platen pivotally and slidably mounted on said guides in a depending position, a ram, power means for moving said ram forwardly in said chamber to compact into a mass material received therein against said platen and move the mass throughout the length of said chamber, means operatively connected to said platen offering resistance to its forward movement resulting from material being compacted thereagainst, said platen and said means being movable to locate at least a portion of the mass beyond said chamber, means for moving said platen forwardly from said mass and said position for releasing said portion from the remainder of said mass at said transverse edge of said chamber, and said resistance means being operable by said power means to pivot said platen away from said portion to permit horizontal travel of the latter thereunder.

17. In combination: structure defining an elongate chamber for receiving material to be compacted, a ram, fluid power means for operating said ram, a movable element normally disposed externally of said chamber in opposed relation to said ram for engaging material adapted to be compacted thereagainst by said ram, fluid operable means for controlling the movement of said element, and means operatively connecting said power means and said fluid operable means whereby the latter controls the amount of power applied to said ram by said power means.

18. The combination defined in claim 17, including a conveyor, power means for operating said conveyor, and means operatively connecting said conveyor power means with said fluid power means whereby the latter controls the operation of said conveyor power means.

19. The combination defined in claim 17, including chute means communicating with said chamber, and a pair of adjustable control means spaced lengthwise of said chute means for controlling the amount of material delivered to said chamber.

20. The combination defined in claim 17, including chute means communicating with said chamber, a pair of adjustable control means spaced lengthwise of said chute means for controlling the amount of material delivered to said chamber, and one of said control means also serving to control the operation of said ram.

21. The combination defined in claim 17, including chute means communicating with said chamber, and means adjustably associated with said chute means for controlling the amount of material delivered to said chamber.

22. In combination: a frame, walls carried by said frame defining an elongate chamber for receiving material to be compacted, a ram, fluid power means for operating said ram to compact the material received, a platen pivotally connected to said frame and disposed in opposed relation to said ram and supported for movement lengthwise of said chamber, fluid operable means operatively connected to said frame and to said platen offering resistance to forward movement of the material during compaction, and conduit means operatively connecting said power means and said fluid operable means whereby the latter controls the amount of power applied to said ram by said power means.

23. The combination defined in claim 22, in which said elongate chamber is provided with an inlet for receiving the material and an outlet for discharging the material, including chute means communicatively connected with said inlet, and means adjustably associated with said chute means for controlling the amount of material delivered to said chamber through said inlet.

24. A machine for compacting material, said machine being provided with a first chamber for initially receiving the material and a second chamber constituting a continuation of said first chamber, a pair of opposed relatively movable members for compacting the material therebetween, said first chamber being provided with square corners and said second chamber being provided with concave corners, and means disposed at the junction between said square and concave corners for gradually converting material formed by said square corners in conformity with that of said concave corners.

25. A machine for receiving and compacting material, said machine comprising supporting structure provided with an elongate chamber, a ram mounted on said supporting structure for movement with respect thereto for compacting the material in said chamber, a primary cylinder mounted on said supporting structure and carrying a piston provided with a rod connected to said ram, a hinged platen disposed in opposed relation to said ram for engaging the material and mounted on said supporting structure for pivotal movement with respect thereto, a pair of cylinders mounted in straddling relation to said chamber and carrying pistons provided with rods respectively connected to said platen for actuating the latter, fluid power means, a plurality of lines operatively connecting said fluid power means and all of said cylinders, and plural valve means operatively connected with said fluid power means and said lines whereby said ram and said platen may be operated to compact material therebetween and pivot said platen for releasing material compacted.

26. In combination: structure defining an elongate chamber, a ram, fluid power means for operating said ram in said chamber for compacting material therein, a movable element disposed in opposed relation to said ram, fluid operable means for controlling the movement of said element, a conveyor, power means for operating said conveyor, means responsive to movement of said element operatively connecting said conveyor power means and said fluid power means whereby the latter controls the operation of said conveyor power means to move said conveyor in one direction, and a control operatively associated with said conveyor for rendering said conveyor power means inoperative when the compacted material travels a predetermined distance on said conveyor.

27. A machine for compacting material into a compact mass, said machine comprising a frame provided with a plurality of wall structures defining an elongate chamber having an inlet through which the material is adapted to be received for compaction and also an outlet, elongate guide means disposed in the sides of said machine, one of said walls adjacent said outlet being provided with a transverse edge, a ram for compacting the material, fluid power means for operating said ram, a platen pivotally mounted on said guide means in opposed relation to said ram, fluid means connected to said platen and offering resistance to forward travel of the platen and the material while the latter is being compacted by said ram, and means whereby the travel of the platen may be controlled for releasing a predetermined portion of the mass laterally from said transverse edge when the material has been fully compacted.

28. The machine defined in claim 27, in which said fluid power means also serves to operate said platen.

29. A machine for compacting material into a compact mass, said machine comprising a frame provided with a plurality of wall structures defining an elongate chamber having an inlet through which the material is adapted to be received for compaction and also an outlet, one of said walls adjacent said outlet being provided with a transverse edge, a ram for compacting the material into layers, fluid power means for operating said ram, a platen mounted on said frame in opposed relation to said ram, fluid means connected to said platen and offering resistance to forward travel of the material when it is being compacted by said ram, a chute for delivering material to said chamber through said inlet, and means adjustable with respect to said chute to determine the thickness of the layers in a manner whereby predetermined layers of the mass of material may be freely released at the junction between layers laterally from said transverse edge when the resistance offered by said platen is reduced.

References Cited by the Examiner

UNITED STATES PATENTS

| | | | |
|---|---|---|---|
| 280,840 | 7/1883 | Lord | 100—244 |
| 334,843 | 1/1886 | Blank | 100—244 |
| 378,197 | 2/1888 | Ertel | 100—244 X |
| 428,976 | 5/1890 | Tebow | 100—255 X |
| 738,068 | 9/1903 | Reynolds | 100—188 X |
| 1,135,309 | 4/1915 | Meakin | 100—179 |
| 2,213,815 | 9/1940 | Jaeger | 100—251 X |
| 2,422,895 | 6/1947 | Habenicht | 100—244 X |
| 2,646,745 | 7/1953 | Seltzer | 100—53 |
| 2,697,979 | 12/1954 | MacMurray | 100—218 X |
| 2,705,916 | 4/1955 | Millgard | 100—95 |
| 2,923,230 | 2/1960 | Bornzin | 100—179 X |
| 3,043,418 | 7/1962 | Morrison et al. | 197—128 |
| 3,045,583 | 7/1962 | Davin | 100—3 X |
| 3,050,809 | 8/1962 | Kupka | 100—264 X |
| 3,099,205 | 7/1963 | Lovrinch | 100—255 |
| 3,198,106 | 8/1965 | Skromme | 100—188 |

FOREIGN PATENTS 491,581   11/1936   Great Britain.

LOUIS O. MAASSEL, *Primary Examiner.*

WALTER A. SCHEEL, *Examiner.*